F. E. LORD.
SAP-SPOUTS.

No. 195,295. Patented Sept. 18, 1877.

WITNESSES:
C. Neveux
J. H. Scarborough

INVENTOR:
F. E. Lord.
BY Munn & Co
ATTORNEYS.

UNITED STATES PATENT OFFICE.

FRANCIS E. LORD, OF READSBOROUGH, VERMONT.

IMPROVEMENT IN SAP-SPOUTS.

Specification forming part of Letters Patent No. 195,295, dated September 18, 1877; application filed July 9, 1877.

*To all whom it may concern:*

Figure 1:
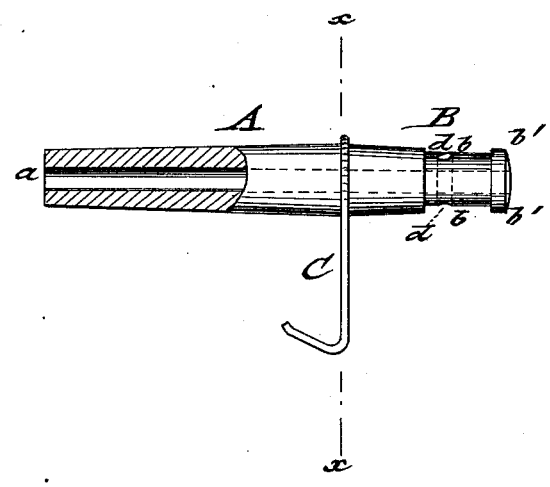
Figure 2:
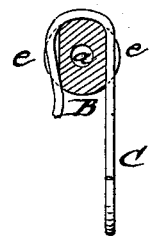

Be it known that I, FRANCIS E. LORD, of Readsborough, in the county of Bennington and State of Vermont, have invented a new and Improved Sap-Spout, of which the following is a specification:

In the accompanying drawing, Figure 1 represents a sectional side view of my improved sap-spout; and Fig. 2, a vertical transverse section of the same on line $x\ x$, Fig. 1.

Similar letters of reference indicate corresponding parts.

This invention relates to a sap-spout for maple and other trees, by which the sap is taken up in superior manner, and the bucket suspended therefrom without the use of nails or other iron material, which is injurious to the tree.

The invention consists of a centrally-perforated spout, whose end that is driven into the tree is made longer and provided with a rim, and annularly recessed and perforated or mortised to take up the sap. The outside of the spout is provided with side recesses for attaching a hanger or hook, from which the pail or other vessel is suspended.

In the drawing, A represents the spout, that is driven into the maple or other tree in the usual manner, and turned of wood, with a hole, $a$, extending through its entire length. The conical end B that is driven into the tree is made longer than in the spouts in use, and arranged with an annular groove or recess, $b$, that leaves a shoulder or rim, $b'$, at the outermost end. The annularly-grooved part $b$ is provided with one or more cross-holes or mortises, $d$, for conveying the sap that collects around the end B, in the space between the tree and the annularly-grooved part, into the central exit-hole of the spout, so as to produce the easy flowing of the sap. The conically-tapering part of the end B keeps the hole in the tree closed in perfectly tight manner. The end shoulder $b'$ is of the same diameter as the inner end of the conical part, and serves to press against the upper side of the hole, so as to form an additional support for the spout, and admit the hanging of a bucket or pail of sap on a hook, C, of the spout without pulling the same out of the tree. The hook C is formed of wire of suitable thickness, and attached by its upper spring end to side recesses $e$ of the spout, close to the tree, the hook part at the lower end extending forward and resting against the tree, so that the pail exerts as small a strain as possible on the spout.

The connection of the spout and hanger or hook dispenses with the iron spouts and nails, which are so injurious to the trees.

Having thus described my invention, I claim as new and desire to secure by Letters Patent—

A sap-spout consisting of a tube having a drive-cone, B, and end rim $b'$, with an annular groove, $b$, between them, as shown and described.

FRANCIS E. LORD.

Witnesses:
 JAMES BULLOCK,
 FRANCIS J. BARTLETT.